April 24, 1928.
A. W. WOLFE
1,667,278
PROJECTING APPARATUS
Filed March 21, 1927
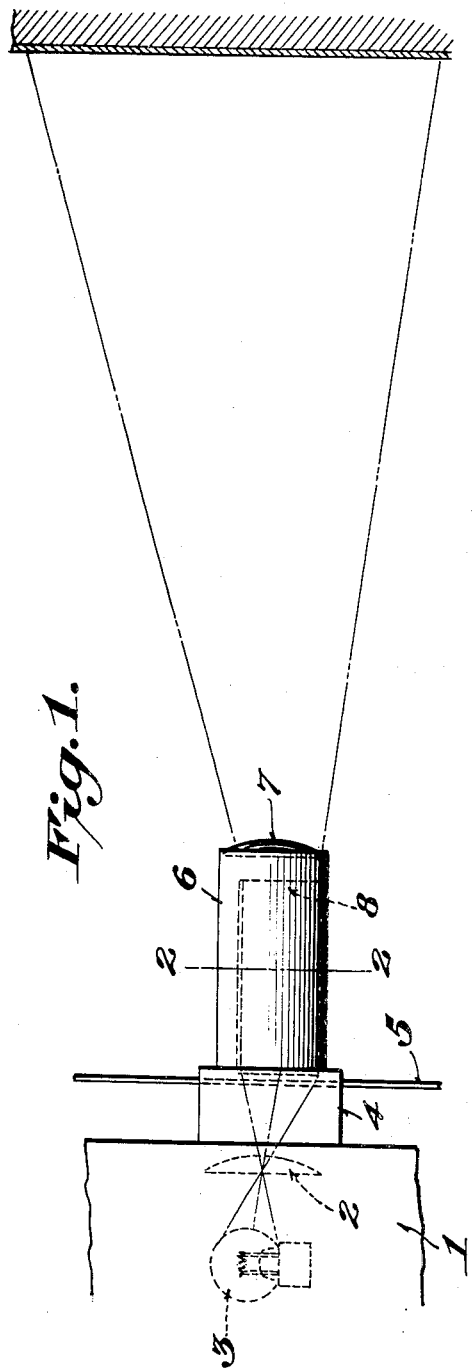
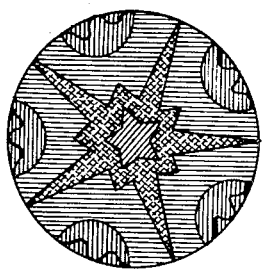
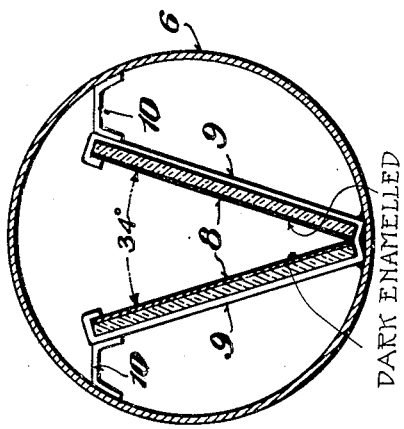
Inventor
A. W. Wolfe
By
Attorney Patented Apr. 24, 1928.

1,667,278

UNITED STATES PATENT OFFICE.

ARTHUR W. WOLFE, OF CHICAGO, ILLINOIS, ASSIGNOR OF ONE-HALF TO THE DIAMOND RAY LIGHT COMPANY, OF CHICAGO, ILLINOIS.

PROJECTING APPARATUS.

Application filed March 21, 1927. Serial No. 177,063.

This invention relates to new and useful improvements in projecting apparatus and pertains more especially to an apparatus for the projection of kaleidoscopic pictures.

An important object of the invention is to provide an apparatus of the character described which will permit of the production and projection of an unlimited variety of pictures of the kaleidoscope type.

Another object of this invention is to provide an apparatus of the character described which will permit of the projection of designs created by the individual operator.

A further object of this invention is to provide an apparatus of the character described which is simple in construction and readily adapted for various types of projection apparatus.

Other objects and advantages of this invention will be apparent throughout the course of the following description and drawings, in which, Fig. 1 is a side elevation of the device secured to a projection apparatus having parts broken away;

Fig. 2 is a sectional view through the invention taken on line 2—2 of Fig. 1, and Fig. 3 is a front elevation of one form of design produced by my invention.

Referring in detail to the drawings, 1 is the housing of a projection apparatus, 2 is a lens mounted within the housing and 3 is a source of light which may be of any suitable arrangement.

Mounted upon the front face of the housing 1 is a guide member 4 of any preferred construction, adapted to receive the usual film strip 5 for movement therethrough.

A casing 6 which may be of any desired shape, is secured at one end to the film guide 4 and is formed at its opposite end to support a lens 7.

Mounted within the casing 6 is a pair of vertically positioned reflector members 8 which are dark enamelled and which have their opposed faces disposed at an angle to each other. A V-shaped holder 9 having its upper ends extending inwardly and downwardly to engage the members 8 is provided to support the reflectors at the desired angle to each other.

A pair of substantially inverted U-shaped members 10 are provided to support the sides of the holder 9 and to retain the same within the casing 6.

In operation, dark enamelled reflector members are arranged within the tubular member preferably at substantially an angle of 34°, which has been found to produce the best results. The source of light is arranged within the housing in back of the lens 2 so that the light rays projected through the film will strike the opposed faces of the reflector members at an angle of 10° producing designs similar to that shown in Fig. 3.

Each design, regardless of shape or color combination, during the projection upon a screen, starts at a zero point in the center of a lighted five section circle and gradually increases in symmetrical shape and merging of colors until it reaches its maximum size, which at no time can be greater than the lighted circle, after which it disappears automatically from view and is seemingly lost in space.

In the reverse operation, the design starts at the greatest circumference of the lighted circle and gradually recedes in proportionate and symmetrical shape to complete oblivion in the center point of the circle.

The use of dark enamelled opaque reflector members has been found to be more advantageous in producing the desired results than the use of members having a higher degree of reflection such as that possessed by the usual silvered mirrors.

Dark enamelled reflectors not only produce the colors in their true tones, but it has been found that their use entirely eliminates any glare from the source of light which may pass through the film from the housing of the projection apparatus.

The film may also be moved horizontally instead of vertically and when moved horizontally it has been found that the reflecting members produce novel designs appearing to have a rotary or whirling motion. Each reflected design is then composed of five substantially angularly shaped units having their apexes meeting at a central point of the whole and each unit then appears to have a whirling motion independent of the others. It has been discovered that this latter novel effect is due to the angular arrangement of the reflecting members as noted in the foregoing.

What is claimed is:—

1. In a projection apparatus, a film having a series of irregular designs thereon, a tubular casing in front of the film, a substantially V-shaped support within said casing having its free ends bent inwardly and downwardly to form depending fingers, and a substantially V-shaped member having opposed reflecting surfaces positioned in said casing and having its upper edges disposed beneath said fingers whereby to retain the same against vertical movement in the casing.

2. In a projection apparatus, a film having a series of irregular designs thereon, a tubular casing in front of the film, a substantially V-shaped support within said casing having its free ends spaced from the casing, said free ends of the support being formed to provide depending fingers, a pair of inverted substantially V-shaped spacing elements disposed between the upper end of the V-shaped support and casing, and a substantially V-shaped member having opposed reflecting surfaces positioned in the casing and having its upper edges disposed beneath said fingers whereby to retain the same against vertical movement in the casing.

In testimony whereof I affix my signature.

ARTHUR W. WOLFE.